(12) United States Patent
Dai

(10) Patent No.: US 10,978,971 B2
(45) Date of Patent: Apr. 13, 2021

(54) METHOD FOR CONTROLLING BRUSHLESS MOTOR

(71) Applicant: Nanjing Chervon Industry Co., Ltd., Nanjing (CN)

(72) Inventor: Xiubo Dai, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 564 days.

(21) Appl. No.: 15/781,648

(22) PCT Filed: Dec. 30, 2016

(86) PCT No.: PCT/CN2016/113468
§ 371 (c)(1),
(2) Date: Jun. 5, 2018

(87) PCT Pub. No.: WO2017/114485
PCT Pub. Date: Jul. 6, 2017

(65) Prior Publication Data
US 2020/0266733 A1    Aug. 20, 2020

(30) Foreign Application Priority Data

Dec. 31, 2015 (CN) .......................... 201511028495.X
Dec. 31, 2015 (CN) .......................... 201511029536.7

(51) Int. Cl.
*H02P 6/15*        (2016.01)

(52) U.S. Cl.
CPC .................................... *H02P 6/153* (2016.02)

(58) Field of Classification Search
CPC ...................................................... H02P 6/153
(Continued)

(56) References Cited

U.S. PATENT DOCUMENTS

| 5,569,990 | A | * | 10/1996 | Dunfield | ................. | H02P 6/185 |
| | | | | | | 318/400.11 |
| 9,088,237 | B2 | | 7/2015 | Sanchez et al. | | |
| 2007/0069669 | A1 | | 3/2007 | MacKay | | |

FOREIGN PATENT DOCUMENTS

| CN | 103199778 A | 7/2013 |
| JP | H05316786 A | 11/1993 |

(Continued)

OTHER PUBLICATIONS

International Searching Authority, China, International Search Report issued on PCT application No. CN2016/113468, dated Apr. 6, 2017, 3 pages.

*Primary Examiner* — David Luo
(74) *Attorney, Agent, or Firm* — Greenberg Traurig, LLP

(57) ABSTRACT

Provided is a method for controlling a brushless motor (101) in a power tool system. The brushless motor (101) includes multiple phase windings (u, v, w). The control method includes: operating the brushless motor (101) in each driving state for a period of time separately; measuring a voltage of a higher-voltage one of two phase input ends to which a driving voltage is applied and defining this voltage as a higher-voltage end voltage; measuring a voltage of a phase input end of one of the multiple phase windings which is kept floating when the driving voltage is applied and defining this voltage as a floating end voltage; determining whether values of the higher-voltage end voltage and the floating end voltage meet a preset condition; and when the values of the higher-voltage end voltage and the floating end voltage meet the preset condition, using any one of the multiple phase windings not serving as the current floating phase as a next floating phase. This method helps improve the running efficiency of the brushless motor (101).

20 Claims, 2 Drawing Sheets

(58) Field of Classification Search
USPC .................. 318/400.14, 400.13, 400.01, 700
See application file for complete search history.

(56) References Cited

FOREIGN PATENT DOCUMENTS

| | | | |
|---|---|---|---|
| JP | 2004364473 | A | 12/2004 |
| JP | 2011030385 | A | 2/2011 |
| JP | 2012152032 | A | 8/2012 |

* cited by examiner

METHOD FOR CONTROLLING BRUSHLESS MOTOR

TECHNICAL FIELD

The present disclosure relates to a method for controlling a brushless motor in a power tool system.

BACKGROUND

Motors are classified into brush motors and brushless motors according to phase commutation methods. The phase commutation of the brush motor is implemented by a commutator and a carbon brush with a rotation of a rotor. For the brushless motor, the phase communication is continuously performed by electronic control so that a winding generates an electromagnetic field whose direction is continuously changing and a rotator rotates under the interaction of a magnetic field and the electromagnetic field.

Brushless motors are classified into an inner-rotor motor and an outer-rotor motor according to a configuration of a rotor and a stator. For both of the inner-rotor motor or the outer-rotor motor, windings can be used as a rotor or a stator.

For a brushless motor, the phase number of the windings, and the number and position of iron cores wound by coils of each phase winding can be designed according to specific requirements. The design principle is to make the coils of each phase winding produce a continuously changing magnetic field in space when each phase winding is energized according to an electrical cycle.

When the simplest two-phase winding motor is electronically controlled, the motor can be driven by switching the states of voltages applied to the two phase windings. Only two phase windings are involved in phase commutation, so, for the electronic control, commutation timing and initial position can be determined in the same way and the control result is either of two phase communication.

When a brushless motor with three phase windings is electronically controlled, the brushless motor has six driving states in one electrical cycle due to the three phase windings, so the driving state to be outputted needs to be determined according to the positon of the rotator when the brushless motor is started. When the brushless motor is normally driven, once the position of the rotator is detected to be changed, phase commutation is performed and another driving state is outputted. Only when a driving state corresponding to the position of the rotator is outputted, can the brushless motor output the maximum torque.

In order to control the brushless motor the position of the rotor needs to be detected. Currently the rotor is detected using two technologies: one is sensory control, that is, a position sensor is used to detect the position of the rotor and generate a control signal; the other is sensorless control, that is, the phase commutation of the brushless motor is controlled according to the position of the rotor and changes of the position which are determined according to changes in electrical parameters of windings.

Sensory control simplifies control logic to make the control more direct. However, when the position of the sensor is inaccurate due to an assembly problem or other problems, the driving of the brushless motor will be affected.

The cost of the sensorless control is lower. In the existing sensorless control, first the rotor is forcedly driven to rotate according to a certain driving state, not according to the position of the rotor. After the rotor rotates at a certain speed, the driving state is gradually switched according to the phase commutation control of the rotor, until a driving state corresponding to the position of the rotator is switched to. Then the normal driving is performed. Although the rotor rotates when being forcedly driven, the brushless motor cannot output enough torque because the driving state does not correspond to the position of the rotor. In addition, this control method relies on that the rotor can rotate at a certain initial speed first. Therefore, when the rotor cannot rotate or is difficult to rotate for some reason, it is difficult to make the brushless motor to be in a correct driving state with such control method.

If the brushless motor is applied to the field of power tool systems, accessories driven by the rotor of the brushless motor tend to make the rotor to bear a load when the rotor is started in the beginning because of locked-rotor (for example, electric pruner and electric chain saw) and the operating conditions (for example, electric screwdriver and electric wrench) when the brushless motor is applied, causing a starting difficult and a low operating efficiency.

SUMMARY

The present disclosure provides a method for controlling a brushless motor in a power tool system. The brushless motor includes three phase windings u, v, w in Y connection, and the three phase windings u, v, w have phase input ends A, B, C respectively. The control method includes steps of: measuring a voltage of a higher-voltage one of the two of the phase input ends to which the driving voltage is applied and defining the voltage of the higher-voltage phase input end as a higher-voltage-end voltage; measuring a voltage at the phase input end which is kept floating when the driving voltage is applied and defining the voltage of the phase input end which is kept floating as a floating-end voltage; determining whether the value of the higher-voltage-end voltage and the value of the floating-end voltage meet a preset condition; and when the value of the higher-voltage-end voltage and the value of the floating-end voltage meet the preset condition, using any one of the two phase windings which are not the currentfloating phase as a next floating phase.

Further, the control method further includes steps of: after applying a first detection voltage to the phase input ends A and B for a first period of time, measuring a voltage or a current of the phase input end C to obtain an electrical parameter K1 in which the phase winding w is used as a floating phase; after applying a second detection voltage to the phase input ends B and A for a second period of time, measuring a voltage or a current of the phase input end C to obtain an electrical parameter K2 in which the phase winding w is used as a floating phase; after applying a third detection voltage to the phase input ends A and C for a third period of time, measuring a voltage or a current of the phase input end B to obtain an electrical parameter K3 in which the phase winding v is used as a floating phase; after applying a fourth detection voltage to the phase input ends C and A for a fourth period of time, measuring a voltage or a current of the phase input end B to obtain an electrical parameter K4 in which the phase winding v is used as a floating phase; after applying a fifth detection voltage to the phase input ends B and C for a fifth period of time, measuring a voltage or a current of the phase input end A to obtain an electrical parameter K5 in which the phase winding u is used as a floating phase; after applying a sixth detection voltage to the phase input ends C and B for a sixth period of time, measuring a voltage or a current of the phase input end A to obtain an electrical parameter K6 in which the phase winding u is used as a floating phase; comparing the electrical parameters K1, K2, K3, K4, K5 and K6; and applying a driving voltage to two of the phase input ends according to a result of comparing the electrical parameters K1, K2, K3, K4, K5 and K6.

Further, the detection voltage applied to two of the phase input ends A, B and C is in a pulse form.

Further, the detection voltage applied each time has a same value.

Further, the detection voltage is applied each time for a same period of time.

Further, the electrical parameter is calculated based on a voltage change of the phase input end of the floating phase.

Further, a difference between values of at least two different voltages of the phase input end of the floating phase is calculated when the electrical parameter is calculated.

Further, the phase input ends where the driving voltage is applied are determined according to a largest one of the electrical parameters.

Further, after the comparison, when a largest one of the electrical parameters is K1, the driving voltage is applied to the phase input ends A and C.

Further, after the comparing, when a largest one of the electrical parameters is K2, the driving voltage is applied to the phase input ends A and B.

Further, after the comparing, when a largest one of the electrical parameters is K3, the driving voltage is applied to the phase input ends C and A.

Further, after the comparing, when a largest one of the electrical parameters is K4, the driving voltage is applied to the phase input ends C and B.

Further, after the comparing, when a largest one of the electrical parameters is K5, the driving voltage is applied to the phase input ends B and A.

Further, after the comparing, when a largest one of the electrical parameters is K6, the driving voltage is applied to the phase input ends B and C.

Further, the control method includes: measuring a voltage of a higher-voltage one of the two of the phase input ends to which the driving voltage is applied and defining the voltage of the higher-voltage phase input end as a higher-voltage-end voltage; measuring a voltage at the phase input end which is kept floating when the driving voltage is applied and defining the voltage of the phase input end which is kept floating as a floating-end voltage; determining whether the value of the higher-voltage-end voltage and the value of the floating-end voltage meet a preset condition; and when the value of the higher-voltage-end voltage and the value of the floating-end voltage meet the preset condition, using any one of the two phase windings which are not the current floating phase, as a next floating phase.

Further, a floating-phase switching sequence when the driving voltage is applied is the same as a floating-phase switching sequence when the detection voltage is applied.

Further, the detection voltage is less than the driving voltage.

The present disclosure further provides yet another method for controlling a brushless motor in a power tool system. The brushless motor includes a plurality of phase windings. Each of the plurality of phase windings is connected to two different ones of a plurality of phase windings, and a joint where one of the plurality of phase windings is connected to another one of the plurality of phase windings is defined as a phase input end. When the brushless motor is normally driven, the plurality of phase windings are periodically in different driving states according to a preset sequence, and when one of the driving states is switched to another one of the driving states, an electromagnetic field generated by the plurality of phase windings deflects by a preset angle. An action of switching from one of the driving states to another one of the driving states is defined as a phase commutation action, a sequence in which the driving states are switched is defined as a phase commutation sequence, and a minimum cycle of repeating the driving states is defined as a minimum electrical cycle. The control method includes: operating the brushless motor in each of the driving states for a period of time; after the each of the driving states ends, measuring a voltage change of the phase input end of a floating phase to obtain a floating phase voltage parameter; comparing the floating phase voltage parameters in the driving states and selecting one of the floating phase voltage parameters as a feature floating phase voltage parameter; and selecting and outputting one of the driving states corresponding to the feature floating phase voltage parameter.

The present disclosure further provides yet another method for controlling a brushless motor in a power tool system. The brushless motor includes a plurality of phase windings and driving input ends for receiving a driving voltage. The control method includes: applying a detection voltage to two of the driving input ends for a preset period of time, during which the rest of the driving input ends are floating; removing the detection voltage and measuring a voltage or a current of a previously floating one of the driving input ends to obtain an electrical parameter; repeating the above process until all combinations formed by two of the driving input ends have been applied with a detection voltage; comparing all measured electrical parameters; and selecting one of the electrical parameters having a greatest variety, and controlling a driving module to output a driving state corresponding to two of the driving input ends where the detection voltage that corresponds to the one of the electrical parameters having the greatest variety is applied and according to a corresponding correspondence.

The present disclosure further provides yet another method for controlling a brushless motor in a power tool system. The brushless motor includes three phase windings u, v, w in Y connection, and the three phase windings u, v, w have phase input ends A, B, C respectively. The control method includes: measuring a voltage of a higher-voltage one of the two of the phase input ends to which a driving voltage is applied and defining the voltage as a higher-voltage end voltage; measuring a voltage of the phase input end of one of the three phase windings that serves as a floating phase when the driving voltage is applied and defining the voltage as a floating end voltage; determining whether the value of the higher-voltage end voltage and the value of the floating end voltage meet a preset condition; and when the value of the higher-voltage end voltage and the value of the floating end voltage meet the preset condition, using any one of the two phase windings, which are not the current floating phase as a next floating phase.

The present disclosure has the following benefit: The driving state corresponding to the position of the rotor of the brushless motor can be outputted according to the position of the rotor of the brushless motor without a position sensor, thereby improving the operating efficiency of the brushless motor when the brushless motor is being activated or is running.

DETAILED DESCRIPTION

Figure 1:
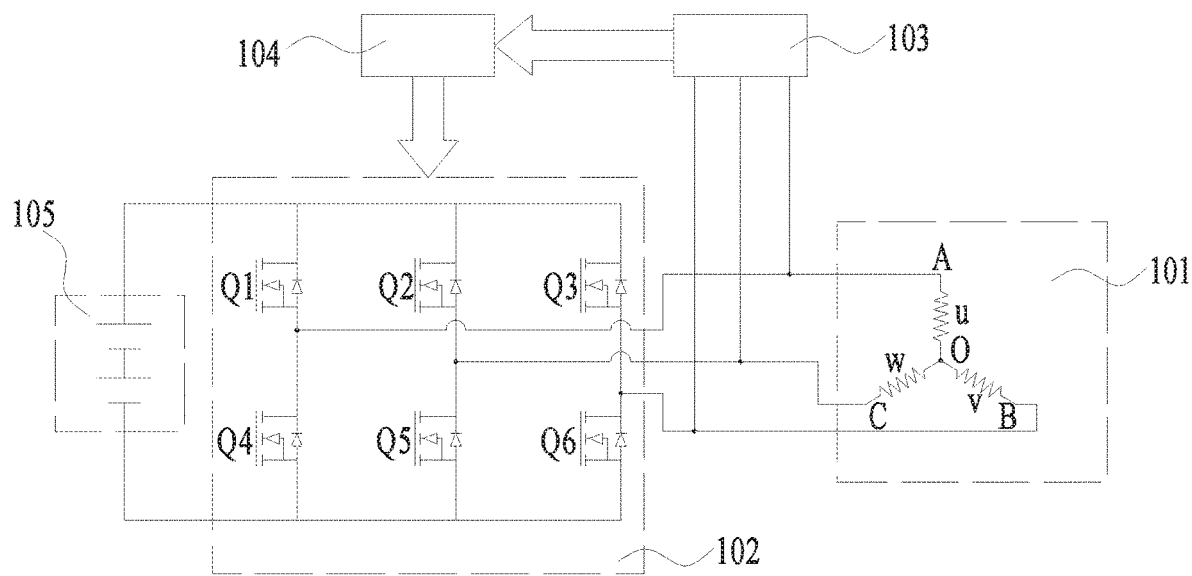
FIG. 1 is a block diagram of a circuit for implementing a control method of the present invention.

A circuit shown in FIG. 1 includes a brushless motor 101, a driving unit 102, a detection module 103, a controller 104 and a power module 105.

The brushless motor 101 includes three phase windings u, v, w in a Y connection. One end of each phase winding is connected to a neutral point. Another end of the each phase winding serves as a lead connecting end of the each phase winding. The lead connecting ends of the phase windings u, v, w are defined as phase input ends A, B, C respectively.

It is to be noted that the connection described in this specification is construed as including any form of electrical connection, regardless of direct electrical connection or indirect electrical connection.

The power module 105 may include a battery having a positive electrode and a negative electrode. The battery may be removable or non-removable. The battery can be rechargeable.

The driving unit 102 includes a driving module or circuit 102a. The driving unit 102 includes six electronic switches Q1-Q6. The six electronic switches Q1-Q6 constitute a six-arm full-bridge circuit as shown in FIG. 1, and the electronic switches Q1-Q6 each have a conducting state and a non-conducting state. When the electronic switches Q1-Q6 are in the conducting state, the electronic switches Q1-Q6 can form a current path between the power module 105 and one of the phase input ends. When the electronic switches Q1-Q6 are in the non-conducting state, the current path between the power module 105 and one of the phase input ends is disconnected. The electronic switches Q1-Q6 can be controlled to be turned on or off by the control signals sent to the electronic switches Q1-Q6.

In one or more embodiments, the electronic switches Q1-Q6 may be semiconductor switches as shown in FIG. 1. In an exemplary embodiment, the electronic switches Q1-Q6 may be unidirectional-conducting semiconductor switches, that is, the electronic switches Q1-Q6 are unidirectional-conducting. When controlled, the electronic switches Q1-Q6 can switch between unidirectional-conducting state and bidirectionally-conducting state. By way of example, the electronic switches Q1-Q6 may be Metal-Oxide-Semiconductor Field-Effect Transistors (MOSFETs).

As shown in FIG. 1, if the controller 104 controls electronic switches Q1 and Q6 to be turned on and other electronic switches Q2, Q3, Q4 and Q5 to be turned off, the positive electrode of the battery in the power module 105 is connected to the phase input end A through the electronic switch Q1, the negative electrode of the battery in the power module 105 is connected to the phase input end B through the electronic switch Q6, and the phase input end C is not connected to the positive electrode and the negative electrode of the battery because electronic switches Q2 and Q5 are both in the non-conducting state (or the unidirectional-non-conducting state). The on-off state of the electronic switches in the driving circuit 102a makes the power module 105 apply a voltage to phase input ends A and B while makes the phase input end C to be floating; For simplicity of description, this state of the driving circuit 102a may be defined as a driving state AB outputted by the driving circuit 102a.

It is to be noted that a floating phase input end herein means that the phase input end is not connected to the power source and does not mean that the phase input end is not connected to any circuit. For example, the phase input end is connected to a circuit for measuring a voltage or a current.

As shown in FIG. 1, if the controller 104 controls electronic switches Q3 and Q4 to be turned on and other electronic switches Q1, Q2, Q5 and Q6 to be turned off, the positive electrode of the battery in the power module 105 is connected to the phase input end B through the electronic switch Q3, the negative electrode of the battery in the power module 105 is connected to the phase input end A through the electronic switch Q4, and the phase input end C is not connected to the positive electrode and the negative electrode of the battery as electronic switches Q2 and Q5 are both in the non-conducting state (or the unidirectional-non-conducting state). With the conducting state of the electronic switches in the driving circuit 102a, the power module 105 applies a voltage to the phase input ends B and A, the phase input end C is floating, and the winding w is used as a floating phase. For simplicity of description, this state of the driving circuit 102a may be defined as a driving state BA outputted by the driving circuit 102a.

As shown in FIG. 1, two electronic switches in the driving circuit 102a are controlled in a similar way. The driving circuit 102a can also output a driving state BC, a driving state CB, a driving state AC and a driving state CA.

The detection module 103 is connected to the phase input end A, the phase input end B and the phase input end C separately. The detection module 103 is used for detecting a voltage or a current at a node where the detection module 103 is connected to.

The controller 104 is configured to receive a signal of the detection module 103 and to send control signals to the electronic switches in the driving unit 102 to implement and switch the driving state. Specifically, the controller 104 may be connected to the detection module 103, and the controller 104 may transmit a control signal by being connected to the driving unit 102. More specifically, the controller 104 may be connected to control ends of the switch Q1 to the switch Q6 separately.

In addition, the controller 104 may be connected to the power module 105 so that the power module 105 supplies power to the controller 104.

When the brushless motor 101 is normally driven to rotate, the controller 104 controls the driving unit 102 to periodically output driving states AB, AC, BC, BA, CA and CB (for convenience of explanation, the driving state AB, the driving state AC, the driving state BC, the driving state BA, the driving state CA and the driving state CB are simply expressed as AB, AC, BC, BA, CA and CB respectively). Each driving state is equivalent to a beat of the rotation of the brushless motor 101 driven by the driving unit 102. The controller 104 switches the driving states to make the windings of the brushless motor 101 generate a changing magnetic field so as to drive the rotor to rotate. Of course, when an inversion is needed, the controller 104 controls the driving unit 102 to periodically output the following driving states: CB, CA, BA, BC, AC and AB.

The outputting and switching of the driving states are illustrated below. For example, the previous driving state is AB. If the phase input end A is unchanged, the phase input end B is changed to be floating, and the phase input end C that is floating in the driving state AB, in place of the phase input end B, is connected to the power module 105, then the driving state is AC. If the phase input end B is unchanged, the phase input end A is changed to be floating, and the phase input end C that is floating in the driving state AB, in place of the phase input end A, is connected to the power module 105, then the driving state is CB. Whether the driving state AB is switched to driving state AC or driving state CB depends on a rotation direction. The advantage of this is that an abrupt change of a winding voltage can be prevented, and a smaller deflection of the magnetic field is more favorable for driving the rotor to rotate smoothly.

Only if the driving state outputted when the controller 104 controls the driving unit 102 to drive the brushless motor 105 matches the position of the rotor of the brushless motor 105, can the rotor obtain a large torque. That is, the controller 104 needs to control the switching of the driving states according to the position of rotor. It is to be noted that the position of the rotor refers to a rotational position of the rotor relative to the stator.

When the driving state does not match the position of rotor, the efficiency and capability of the brushless motor will be affected.

As described in the background art, the position sensor can certainly provide the controller 104 with information about the position of the rotor but incurs drawbacks. The sensorless control cannot drive the brushless motor 105 effectively in a working condition where the brushless motor 105 is started with a load or the brushless motor 105 bears a large load.

In a sensorless control scheme shown in FIG. 1, in a working condition where the brushless motor 105 is started with a load or the brushless motor 105 bears a large load, that is, the rotor is almost stationary or rotates at a very low speed, the controller 104 needs to obtain the information about the position of the rotor so as to output a corresponding driving state to enable the brushless motor 105 to output a higher torque. In the field of power tool systems, starting with a load and bearing a large load are common; therefore, the existing brushless motors with the sensorless control are not well applicable to a power tool system. The power tool system of the present invention may include a hand-held power tool and/or a garden machine.

A control method based on the hardware shown in FIG. 1 is described below. The control method includes the steps described below.

The controller 104 controls the driving unit 102 to output the driving state AB for a preset period of time. Then, the controller 104 controls the driving unit 102 to disconnect all phase input ends A, B and C of the brushless motor from the power source for a preset period of time. At the same time, a voltage or a current at the phase input end C is measured, and an electrical parameter K1 is obtained according to the measured voltage or current at the phase input end C.

In other words, the controller 104 controls the driving unit 102 to generate such a configuration that the phase input end C is floating, a detection voltage is applied to the phase input ends A and B with the phase input end A as a higher-voltage end and the phase input end B as a lower-voltage end, the detection voltage is applied for a preset period of time, and then the phase input ends A, B and C are all changed to be floating. The controller 104 measures a change in the voltage or the current of the phase input end C through the detection module 103 so as to obtain the electrical parameter K1 related to the voltage or the current at the phase input end C.

It should be noted that the time during which the controller 104 controls the driving unit 102 to output the driving state AB is short. It can be regarded that the rotor has barely rotated in such a short time. In addition, the driving state AB outputted by the driving circuit for the purpose of obtaining the electrical parameter and the driving state AB outputted when the rotor is normally driven are the same for the state of the electronic switches. The difference lies that a time interval exists between different driving states when electrical parameters are measured whereas a driving state is directly switched to another when the rotor is normally driven. A duration of a driving state for detecting the electrical parameter and a duration of a driving state when the rotor is normally driven are different. The duration of the driving state for detecting the electrical parameter is a preset value whereas the duration of the driving state when the rotor is normally driven depends on a signal feedback based on the position of the rotor. However, the voltage outputted by the driving unit 102 to a corresponding winding may be changed by the power module 105 or by an additional circuit or device. That is, if a voltage applied to the winding based on the driving state outputted before the electrical parameter is measured is defined as a detection voltage whereas a voltage applied to the winding based on the driving state outputted when the rotor is normally driven to rotate is defined as a driving voltage, then the detection voltage may be equal to or may be less than the driving voltage. As an optional scheme, the detection voltage may be equal to the driving voltage, which simplifies the structure of the power module 105.

Similarly, the controller 104 controls the driving unit 102 to put the brushless motor in the driving state BA for a preset period of time. Then, the controller 104 controls the driving unit 102 to disconnect all phase input ends A, B and C of the brushless motor from the power source for a preset period of time. At the same time, a voltage or a current at the phase input end C is measured, and an electrical parameter K2 is obtained according to the measured voltage or current at the phase input end C.

In other words, the controller 104 controls the driving unit 102 to generate such a configuration the phase input end C is floating, a detection voltage is applied to the phase input ends B and A for a preset period of time with the phase input end B as a higher-voltage end and the phase input end A as a lower-voltage end, and then the phase input ends A, B and C are all changed to be floating. The controller 104 uses the detection module 103 to detect a change in the voltage or the current at the phase input end C so as to obtain the electrical parameter K2 related to the voltage or the current at the phase input end C.

The controller 104 controls the driving unit 102 to output driving states AB, BA, AC, CA, BC and CB each for a preset period of time, and makes all the phase input ends to be floating for a preset period of time after each of the driving states, and, during this preset periods of time, a change in a voltage or a current at the phase input end that is floating in the previous driving state is measured to obtain corresponding electrical parameters K1, K2, K3, K4, K5 and K6.

The controller 104 compares the electrical parameters K1, K2, K3, K4, K5 and K6 and outputs a control signal corresponding to the current position of the rotor.

In an exemplary embodiment, the controller 104 compares the magnitudes of the electrical parameters K1, K2, K3, K4, K5 and K6, and determines the driving state that corresponds to the current position and should be outputted according to a driving state corresponding to a larger one or a smaller one of the electrical parameters.

For example, if, through comparison, the controller 104 determines that K1 is the largest or smallest one of all the electrical parameters, then the controller 104 outputs, according to a built-in correspondence, a control signal that enables the driving unit 102 to output the driving state AC. Similarly, if, through comparison, the controller 104 determines that K2, K3, K4, K5 or K6 is the largest or smallest one of all the electrical parameters, then the controller 104 outputs, according to the built-in correspondence, a control signal that enables the driving unit 102 to output the driving state AB, CA, CB, BA, BC, respectively. A phenomenon is learned from experiments. When no voltage is applied to each of the phase windings, the rotor of the brushless motor 101 is rotated for one electrical cycle under an external force, and voltages measured at phase input ends when the rotor is at positions in a different driving states are different. The fundamental principle of this phenomenon is that the magnetic field changes the electromotive force generated the windings changes due to the change of the change of the magnetic field.

However, in an actual application, the motor 101 cannot be rotated by an external force from a stationary station. This is because in most cases, as described above, the motor 101 bears a load or has a locked-rotor.

In addition, the control itself is to accurately output, according to the actual position, a driving state to start the motor 101. Thus, it is impossible to use the external force to rotate the rotor and then implement detection and control.

In the actual control, the significance of determining the position of the rotor lies in determining a driving state that should be outputted in the current position.

The above control method first energizing the windings with all the driving states to cause the windings to be in different powered states. A set of electrical parameters measured when the rotor is at a first rotational position are different from another set of electrical parameters measured when the rotor is at a second rotational position due to changes in the condition of the magnetic field (caused by changes in the position of the rotor).

It is found from an analysis that the largest or smallest one of the electrical parameters can often indicate the condition of the magnetic field, that is, the position of the rotor. In such indication, it is not that the position of the rotor is directly sensed, but that a driving state corresponding to the position of the rotor is outputted directly according to the built-in correspondence according to an energizing condition corresponding to the largest or smallest one of the electrical parameters, that is, a driving state applied to detection.

In one or more embodiments, the electrical parameter may be an electrical parameter that can be directly measured, such as a voltage or a current, or may be a parameter calculated from the voltage or the current.

In an exemplary embodiment, the electrical parameter is a slope of the voltage of the phase input end that is floating; or the electrical parameter is a derivative of the voltage of the phase input end that is floating. The derivative may be a first derivative, a second derivative or above.

In another exemplary embodiment, a voltage difference, in place of the slope or the derivative, may be used to indicate a degree of the voltage change. To give a unified standard for a comparison of the electrical parameters, a sampling interval of two voltage values for calculating the difference each time and a relative time interval for canceling the detection voltage are the same. For example, the electrical parameter K1 is the difference between a first voltage value and a second voltage value, K2 is the difference between a third voltage value and a fourth voltage value, the time interval between the sampling time of the first voltage value and the sampling time of the second voltage value is equal to the time interval between the sampling time of the third voltage value and the sampling time of the fourth voltage value, and the time interval between the sampling time of the first voltage value and the ending time of the driving state AB for applying the detection voltage is the same as the time interval between the sampling time of the third voltage value and the ending time of the driving state BA for applying the detection voltage.

The controller 104 may output a set of pulse signals to the driving unit 102 to achieve driving states required for detecting the electrical parameters.

In addition, to achieve the driving state switching when the motor is normally driven to rotate, the control method further includes:

measuring a voltage at a higher-voltage end of the two of the phase input ends to which the driving voltage is applied and defining the voltage as a higher-voltage-end voltage;

measuring a voltage of the phase input end that is floating when the driving voltage is applied and defining the voltage as a floating-end voltage;

determining whether the value of the higher-voltage-end voltage and the value of the floating-end voltage meet a preset condition; and when the value of the higher-voltage-end voltage and the value of the floating-end voltage meet the preset condition, using a phase winding which is not currently serving as the floating phase as a floating phase, that is, switching the driving state.

Specifically, the time for the driving state switching can be determined according to a comparison between the higher-voltage-end voltage and the floating-end voltage. This comparison method for determining the time for the driving state switching is applicable to a normal running state of the brushless motor 101. To cope with a variety of working conditions, this scheme and the above scheme in which the driving state that should be outputted is determined by the applied detection voltage can be put into intermixed use, thereby improving the operation efficiency of the brushless motor 101.

Figure 2:
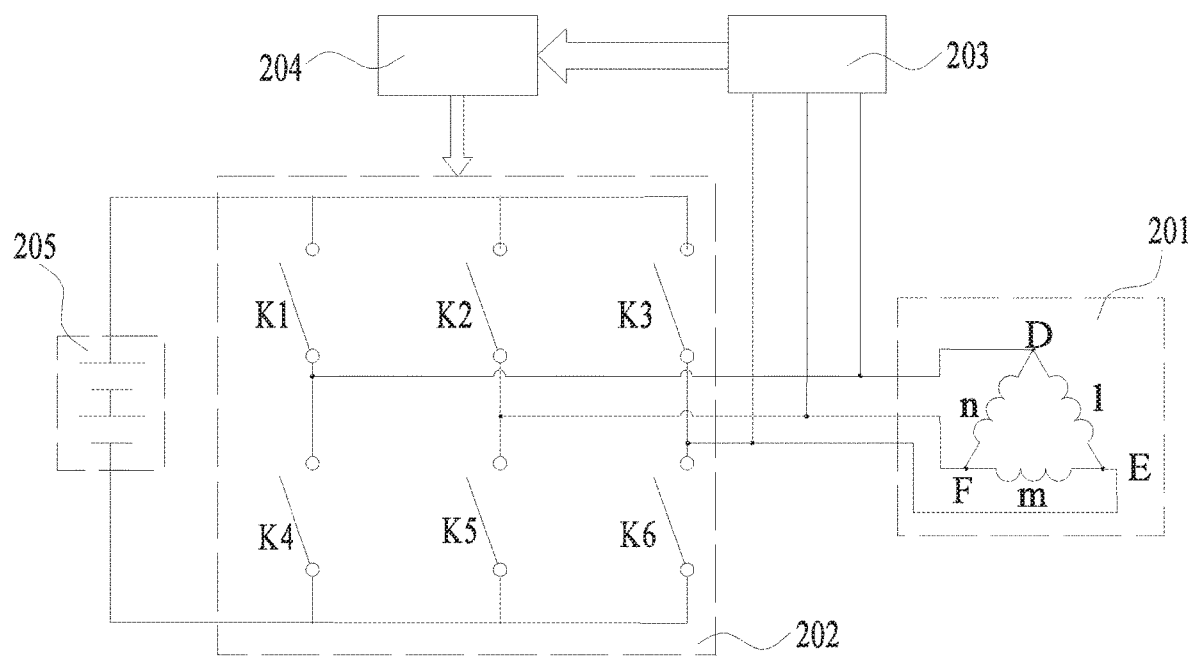
FIG. 2 is a block diagram of another circuit for implementing a control method of the present invention.

A circuit shown in FIG. 2 includes a brushless motor 201, a driving module 202, a detection module 203, a controller 204 and a power module 205.

The brushless motor 201 includes three phase windings 1, m, n in delta connection. Different from the Y connection, connecting ends of each phase winding is connected to two ends of different windings. That is, one of the two connecting ends of the winding 1 is connected to a connecting end of the winding m and the other of the two connecting ends of the winding 1 is connected to a connecting end of the winding n. According to this connection manner, connecting ends of the three phase windings 1, m, n are connected end to end in sequence. In the delta connection, the three phase windings essentially have three input ends. The three winding input ends are defined as a winding input end D, a winding input end E and a winding input end F.

It is to be noted that the connection described herein includes any form of electrical connection, regardless of direct electrical connection or indirect electrical connection.

The power module 205 may include a battery having a positive electrode and a negative electrode. The battery may be removable or non-removable. The battery is rechargeable.

The driving circuit 202 includes six electronic switches K1-K6. The six electronic switches K1-K6 constitute a six-arm full-bridge circuit as shown in FIG. 2, and the electronic switches K1-K6 each have a conducting state and a non-conducting state. When any two of the six electronic switches K1-K6 are in the conducting state, the six electronic switches K1-K6 can form a current path between the power module 205 and the winding input end of one of the windings. When the six electronic switches K1-K6 are in the non-conducting state, the current path between the power module 205 and the winding input end of the one of the windings is non-conductive. The electronic switches K1-K6 can be controlled to be turned on or off by the control signals sent to the electronic switches K1-K6.

In one or more embodiments, the electronic switches K1-K6 may be semiconductor switches as shown in FIG. 2. In an exemplary embodiment, the electronic switches K1-K6 may be unidirectional-conducting semiconductor switches. That is, the electronic switches Q1-Q6 are unidirectional-conducting. When controlled, the electronic switches Q1-Q6 can switch between unidirectional-conducting state and bidirectional-conducting state. By way of example, the electronic switches K1-K6 may be Metal-Oxide-Semiconductor Field-Effect Transistors (MOSFETs).

As shown in FIG. 2, if the controller 204 controls electronic switches K1 and K6 to be turned on and other electronic switches K2, K3, K4 and K5 to be turned off, the positive electrode of the battery in the power module 205 is connected to the winding input end D through the electronic switch K1, the negative electrode of the battery in the power module 205 is connected to the winding input end E through the electronic switch K6. The difference with respect to the circuit shown in FIG. 1 is that, in FIG. 2, the winding m and the winding n are connected in series, and the winding input end F between the winding m and the winding n that are connected in series is not directly connected to the positive electrode and the negative electrode of the battery because the electronic switches K2 and K5 are both in the non-conducting state. The conducting state of the electronic switches in the driving circuit 202 makes the power module 205 apply a voltage to the winding input ends D and E and make the winding input end F be floating. For simplicity of description, this state of the driving circuit 202 may be defined as a driving state DE outputted by the driving circuit 202.

It is to be noted that a winding input end that is floating herein means that the winding input end is not connected to the power source and does not mean that the winding input end is not connected to any circuit. For example, the winding input end is connected to a circuit for measuring a voltage or a current.

As shown in FIG. 2, if the controller 204 controls electronic switches K3 and K4 to be turned on and other electronic switches K1, K2, K5 and K6 to be turned off, the positive electrode of the battery in the power module 205 is connected to the winding input end E through the electronic switch K3, the negative electrode of the battery in the power module 205 is connected to the winding input end D through the electronic switch K4, and the winding input end F is not connected to the positive electrode and the negative electrode of the battery as electronic switches K2 and K5 are both in the non-conducting state (the unidirectionally-non-conducting state). The on-off state of the electronic switches in the driving circuit 202 makes the power module 205 apply a voltage to winding input ends D and E and makes the winding input end F be floating. The winding n is used as a floating phase. For simplicity of description, this state of the driving circuit 202 may be defined as a driving state ED outputted by the driving circuit 202.

As shown in FIG. 2, two electronic switches in the driving circuit 202 are controlled in a similar way. The driving circuit 202 can also output a driving state EF, a driving state FE, a driving state DF and a driving state FD.

The detection module 203 is connected to the winding input end D, the winding input end E and the winding input end F separately. The detection module 203 is used for measuring a voltage or a current at a joint or node to which the detection module 203 is connected.

The controller 204 is configured to receive a signal of the detection module 203 and to send control signals to the electronic switches in the driving module 202 for the implementation and switching of the driving states. Specifically, the controller 204 may be connected to the detection module 203, and the controller 204 may send the control signals by being connected to the driving module 202. More specifically, the controller 204 may be connected to control ends of the switches K1 to K6 separately.

In addition, the controller 204 may be connected to the power module 205 so that the power module 205 supplies power to the controller 204.

When the brushless motor 201 is normally driven to rotate, the controller 204 controls the driving module 202 to periodically output driving states DE, DF, EF, ED, FD and FE (for convenience of explanation, the driving state DE, the driving state DF, the driving state EF, the driving state ED, the driving state FD and the driving state FE are simply expressed as DE, DF, EF, ED, FD and FE respectively). Each driving state is equivalent to a beat of the driving of the rotation of the brushless motor 201. By switching the driving states, the controller 204 causes the windings of the brushless motor 201 to generate a changing magnetic field so as to drive the rotor to rotate. Of course, when the rotator needs to rotate in a reverse sequence, the controller 204 controls the driving module 202 to periodically output the following driving states: FE, FD, ED, EF, DF and DE.

The outputting and switching of the driving states are described below. For example, if the previous driving state is DE, and if the winding input end D is unchanged, the winding input end E is changed to be floating, and the winding input end F that is floating in the driving state DE, in place of the winding input end E, is connected to the power module 205, then the driving state is DF. If the winding input end E is unchanged, the winding input end D is changed to be floating, and the winding input end F that is floating in the driving state DE, in place of the winding input end D, is connected to the power module 205, then the driving state is FE. Whether the driving state DE is switched to DF or FE depends on the rotation direction. The advantage of this is that an abrupt change of a winding voltage can be prevented, and a smaller deflection of the magnetic field is more favorable for driving the rotor to rotate smoothly.

Only if the driving state outputted when the controller 204 controls the driving module 202 to drive the brushless motor 205 matches the position of the rotor of the brushless motor 205, can the rotor obtain a large torque. That is, the controller 204 needs to control the driving state switching according to the position of rotor. It is to be noted that the position of the rotor refers to the rotational position of the rotor relative to the stator.

When the driving state does not match the position of rotor, the efficiency and capability of the brushless motor will be affected.

As described in the background, the position sensor can certainly provide the controller 204 with information about the position of the rotor but incurs drawbacks, the brushless motor 205 cannot be effectively drive by the sensorless control in a working condition where the brushless motor 205 is started with a load or the brushless motor 105 bears a large load.

In the sensorless control scheme shown in FIG. 2, in a working condition where the brushless motor 205 is started with a load or the brushless motor 205 bears a large load, that is, in a working condition where the rotor is almost stationary or rotates at a low speed, the controller 204 obtains the information about the position of the rotor and thereby outputs a corresponding driving state to enable the brushless motor 205 to output a higher torque. In the field of power tool systems, starting with a load and bearing a large load are common; therefore, the existing brushless motors under sensorless control are not well applicable to power tool systems.

A control method based on the hardware shown in FIG. 2 is described below. The control method includes the steps described below.

The controller 204 controls the driving module 202 to output the driving state DE for a preset period of time. Then, the controller 204 controls the driving module 202 to disconnect all winding input ends D, E and F of the brushless motor from the power source for a preset period of time. At the same time, a voltage or a current at the winding input end F is measured, and an electrical parameter K1 is obtained according to the measured voltage or current at the winding input end F.

In other words, the controller 204 controls the driving module 202 such that the winding input end F is floating, a detection voltage is applied to the winding input ends D and E for a preset period of time with the winding input end D as a higher-voltage end and the winding input end E as a lower-voltage end, and then the winding input ends D, E and F are all floating. The controller 204 uses the detection module 203 to measure a change in the voltage or the current at the winding input end F so as to obtain the electrical parameter K1 related to the voltage or the current at the winding input end F.

The controller 204 controls the driving module 202 to output driving states DE, ED, DF, FD, EF and FE each for a preset period of time, and then makes the all the winding input ends being floating for a preset period of time after each of the driving states. During this preset period of time, a change in the voltage or the current at the winding input end that is floating in a previous driving state is measured to obtain corresponding electrical parameters K1, K2, K3, K4, K5 and K6.

The controller 204 compares the electrical parameters K1, K2, K3, K4, K5 and K6 and outputs a control signal corresponding to the current position of the rotor.

In an exemplary example, the controller 204 compares the magnitudes of the electrical parameters K1, K2, K3, K4, K5 and K6, and determines a driving state corresponding to the current position according to a driving state corresponding to a larger one or a smaller one of the electrical parameters.

According to the above principle, the above method is also applicable to the winding connection shown in FIG. 2.

From FIG. 2, it can be seen that the scheme shown in FIG. 2 differs from the scheme shown in FIG. 1 in that windings are connected in different ways, but the two schemes both provide three connecting ends for the driving circuit to apply a driving voltage. The scheme shown in FIG. 1 defines the connecting ends as phase input ends whereas the scheme shown in FIG. 2 defines the connecting ends as winding input ends. In fact, both the phase input ends and the winding input ends may be defined as drive input ends are connected to the driving circuit to receive a driving voltage.

According to this definition, the above method of detecting a position of a rotor can be summarized as: applying a detection voltage to two of drive input ends of the windings of the motor for a preset period of time, during which the rest ones of the drive access ends are floating; removing the detection voltage and detecting a voltage or a current of one or more of the drive access ends that are floating previously to obtain an electrical parameter; repeating the above process until all combinations formed by two of the drive access ends have been applied with the detection voltage; comparing all detected electrical parameters; and selecting one of the electrical parameters with a greatest variety, and controlling the driving module to output a driving state corresponding to the two of the driving input ends where the detection voltage that corresponds to the electrical parameter having the greatest variety is applied and according to a corresponding correspondence between the driving state and two of the driving input ends.

The above illustrates and describes basic principles, main features and advantages of the present disclosure. It is to be understood by those skilled in the art that the above embodiments do not limit the present disclosure in any form, and all solutions obtained by means of equivalent substitution or equivalent transformation fall within the protection scope of the present disclosure.

What is claimed is:

1. A method for controlling a brushless motor in a power tool system, wherein the brushless motor comprises three phase windings u, v, w in Y connection, and the three phase windings u, v, w have phase input ends A, B, C respectively; the method comprising steps of:

after applying a first detection voltage to the phase input ends A and B for a first period of time, measuring a voltage or a current of the phase input end C to obtain an electrical parameter K1 in which the phase winding w is used as a floating phase;

after applying a second detection voltage to the phase input ends B and A for a second period of time, measuring a voltage or a current of the phase input end C to obtain an electrical parameter K2 in which the phase winding w is used as a floating phase;

after applying a third detection voltage to the phase input ends A and C for a third period of time, measuring a voltage or a current of the phase input end B to obtain an electrical parameter K3 in which the phase winding v is used as a floating phase;

after applying a fourth detection voltage to the phase input ends C and A for a fourth period of time, measuring a voltage or a current of the phase input end B to obtain an electrical parameter K4 in which the phase winding v is used as a floating phase;

after applying a fifth detection voltage to the phase input ends B and C for a fifth period of time, measuring a voltage or a current of the phase input end A to obtain an electrical parameter K5 in which the phase winding u is used as a floating phase;

after applying a sixth detection voltage to the phase input ends C and B for a sixth period of time, measuring a voltage or a current of the phase input end A to obtain an electrical parameter K6 in which the phase winding u is used as a floating phase;

comparing the electrical parameters K1, K2, K3, K4, K5 and K6; and applying a driving voltage to two of the phase input ends according to a result of comparing the electrical parameters K1, K2, K3, K4, K5 and K6.

2. The method of claim 1, wherein the detection voltage applied to two of the phase input ends A, B and C is in a pulse form.

3. The method of claim 1, wherein the detection voltage applied each time has a same value.

4. The method of claim 1, wherein the detection voltage is applied each time for a same period of time.

5. The method of claim 1, wherein the electrical parameter is calculated based on a voltage change of the phase input end of the floating phase.

6. The method of claim 5, wherein a difference between values of at least two different voltages of the phase input end of the floating phase is calculated when the electrical parameter is calculated.

7. The method of claim 1, wherein the phase input ends where the driving voltage is applied to are determined according to a largest one of the electrical parameters.

8. The method of claim 1, wherein after the comparison, when a largest one of the electrical parameters is K1, the driving voltage is applied to the phase input ends A and C.

9. The method of claim 1, wherein after the comparing, when a largest one of the electrical parameters is K2, the driving voltage is applied to the phase input ends A and B.

10. The method of claim 1, wherein after the comparing, when a largest one of the electrical parameters is K3, the driving voltage is applied to the phase input ends C and A.

11. The method of claim 1, wherein after the comparing, when a largest one of the electrical parameters is K4, the driving voltage is applied to the phase input ends C and B.

12. The method of claim 1, wherein after the comparing, when a largest one of the electrical parameters is K5, the driving voltage is applied to the phase input ends B and A.

13. The method of claim 1, wherein after the comparing, when a largest one of the electrical parameters is K6, the driving voltage is applied to the phase input ends B and C.

14. The method of claim 1, further comprising:
measuring a voltage of a higher-voltage one of the two of the phase input ends to which the driving voltage is applied and defining the voltage of the higher-voltage phase input end as a higher-voltage-end voltage;
measuring a voltage at the phase input end which is kept floating when the driving voltage is applied and defining the voltage of the phase input end which is kept floating as a floating-end voltage;
determining whether the value of the higher-voltage-end voltage and the value of the floating-end voltage meet a preset condition; and
when the value of the higher-voltage-end voltage and the value of the floating-end voltage meet the preset condition, using any one of the two phase windings, which are not the current floating phase, as a next floating phase.

15. The method of claim 14, wherein a floating-phase switching sequence when the driving voltage is applied is the same as a floating-phase switching sequence when the detection voltage is applied.

16. The method of claim 15, wherein the detection voltage is less than the driving voltage.

17. A method for controlling a brushless motor in a power tool system, wherein the brushless motor comprises a plurality of phase windings, one end of each of the plurality of phase windings is connected to a neutral point and the other end of the each of the plurality of phase windings serves as a phase input end of the each of the plurality of phase windings, when the brushless motor is normally driven, the plurality of phase windings are periodically in different driving states according to a preset sequence, and when one of the driving states is switched to another one of the driving states, an electromagnetic field generated by the plurality of phase windings deflects by a preset angle;
an action of switching from one of the driving states to another one of the driving states is defined as a phase commutation action; a sequence in which the driving states are switched is defined as a phase commutation sequence; a minimum cycle of repeating the driving states is defined as a minimum electrical cycle;
the method comprising:
operating the brushless motor in each of the driving states for a period of time;
after each of the driving state ends, measuring a voltage change of a phase input end of a floating phase to obtain a floating phase voltage parameter;
comparing the floating phase voltage parameters of the driving states and selecting one of the floating phase voltage parameters as a feature floating phase voltage parameter; and
selecting and outputting one of the driving states corresponding to the feature floating phase voltage parameter.

18. A method for controlling a brushless motor in a power tool system, wherein the brushless motor comprises a plurality of phase windings, wherein each of the plurality of phase windings is connected to two different ones of the plurality of phase windings; a joint where one of the plurality of phase windings is connected to another one of the plurality of phase windings is defined as a phase input end, when the brushless motor is normally driven, the plurality of phase windings are periodically in different driving states according to a preset sequence, and when one of the driving states is switched to another one of the driving states, an electromagnetic field generated by the plurality of phase windings deflects by a preset angle;
an action of switching from one of the driving states to another one of the driving states is defined as a phase commutation action, a sequence in which the driving states are switched is defined as a phase commutation sequence; a minimum cycle of repeating the driving states is defined as a minimum electrical cycle;
the method comprising:
operating the brushless motor in each of the driving states for a period of time;
after the each of the driving states ends, measuring a voltage change of the phase input end of a floating phase to obtain a floating phase voltage parameter;
comparing the floating phase voltage parameters in the driving states and selecting one of the floating phase voltage parameters as a feature floating phase voltage parameter; and
selecting and outputting one of the driving states corresponding to the feature floating phase voltage parameter.

19. A method for controlling a brushless motor in a power tool system, wherein the brushless motor comprises a plurality of phase windings having driving input terminals for receiving a driving voltage, the method comprising:
applying a detection voltage to two of the driving input ends for a preset period of time, during which the rest of the driving input ends are floating;
removing the detection voltage and measuring a voltage or a current of a previously floating one of the driving input ends to obtain an electrical parameter;
repeating the above process until all combinations formed by two of the driving input ends have been applied with a detection voltage;
comparing all measured electrical parameters; and
selecting one of the electrical parameters having a greatest variety, and controlling a driving module to output a driving state by detecting a position of the rotor based on said one of the electrical parameters having a greatest variety.

20. A method for controlling a brushless motor in a power tool system, wherein the brushless motor comprises three phase windings u, v, w in Y connection, and the three phase windings u, v, w have phase input ends A, B, C respectively, the method comprising:

measuring a voltage of a higher-voltage one of the two of the phase input ends to which a driving voltage is applied and defining the voltage as a higher-voltage end voltage;

measuring a voltage of the phase input end of one of the three phase windings that serves as a floating phase when the driving voltage is applied and defining the voltage as a floating end voltage;

determining whether the value of the higher-voltage end voltage and the value of the floating end voltage meet a preset condition; and when the value of the higher-voltage end voltage and the value of the floating end voltage meet the preset condition, using one of the two phase windings which are not currently serving as the floating phase as the floating phase.

* * * * *